(No Model.) 3 Sheets—Sheet 2.
J. H. HERRING.
STALK CUTTER.
No. 510,789. Patented Dec. 12, 1893.
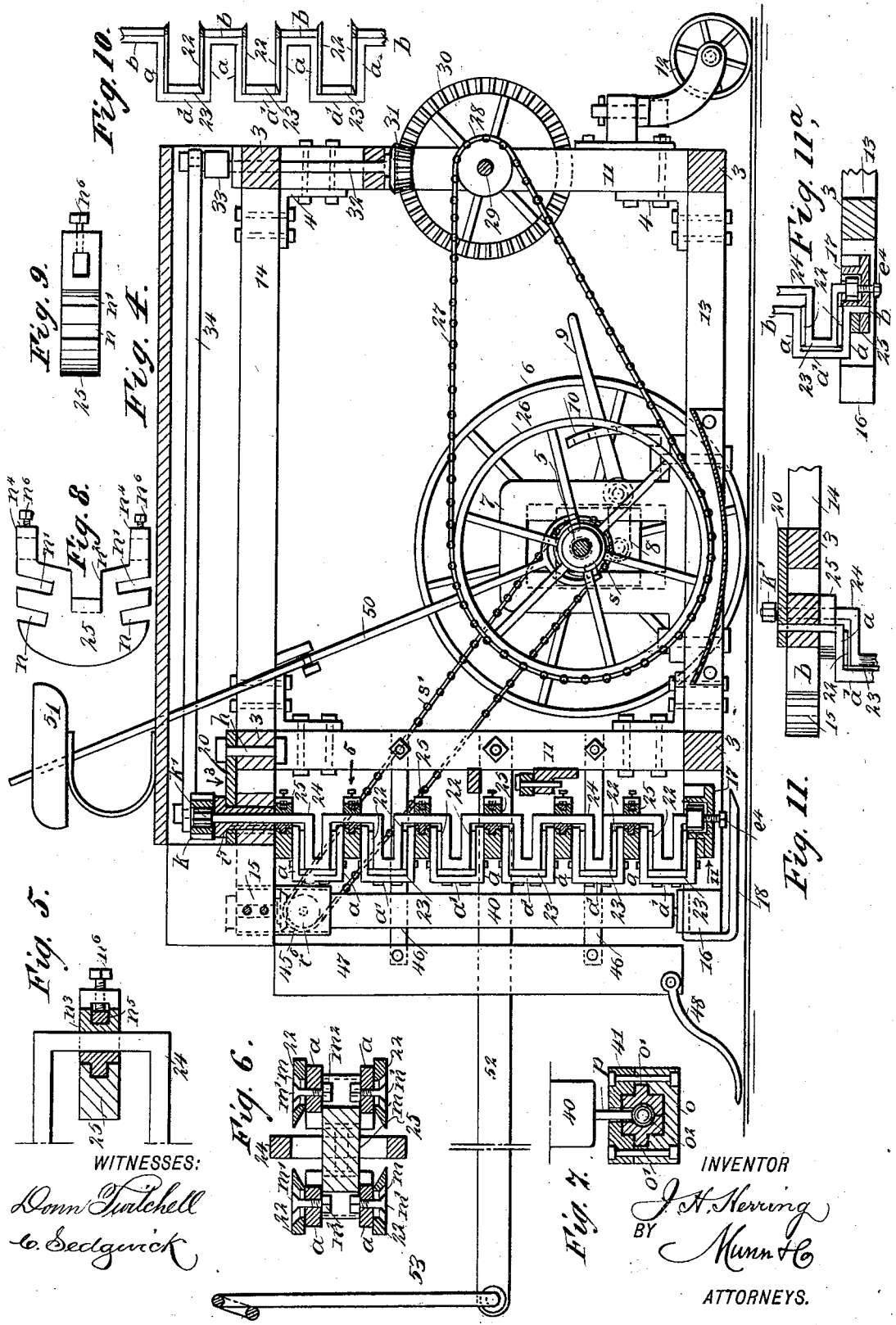
WITNESSES:
Donn Twitchell
C. Sedgwick
INVENTOR
J. H. Herring
BY
Munn & Co
ATTORNEYS.

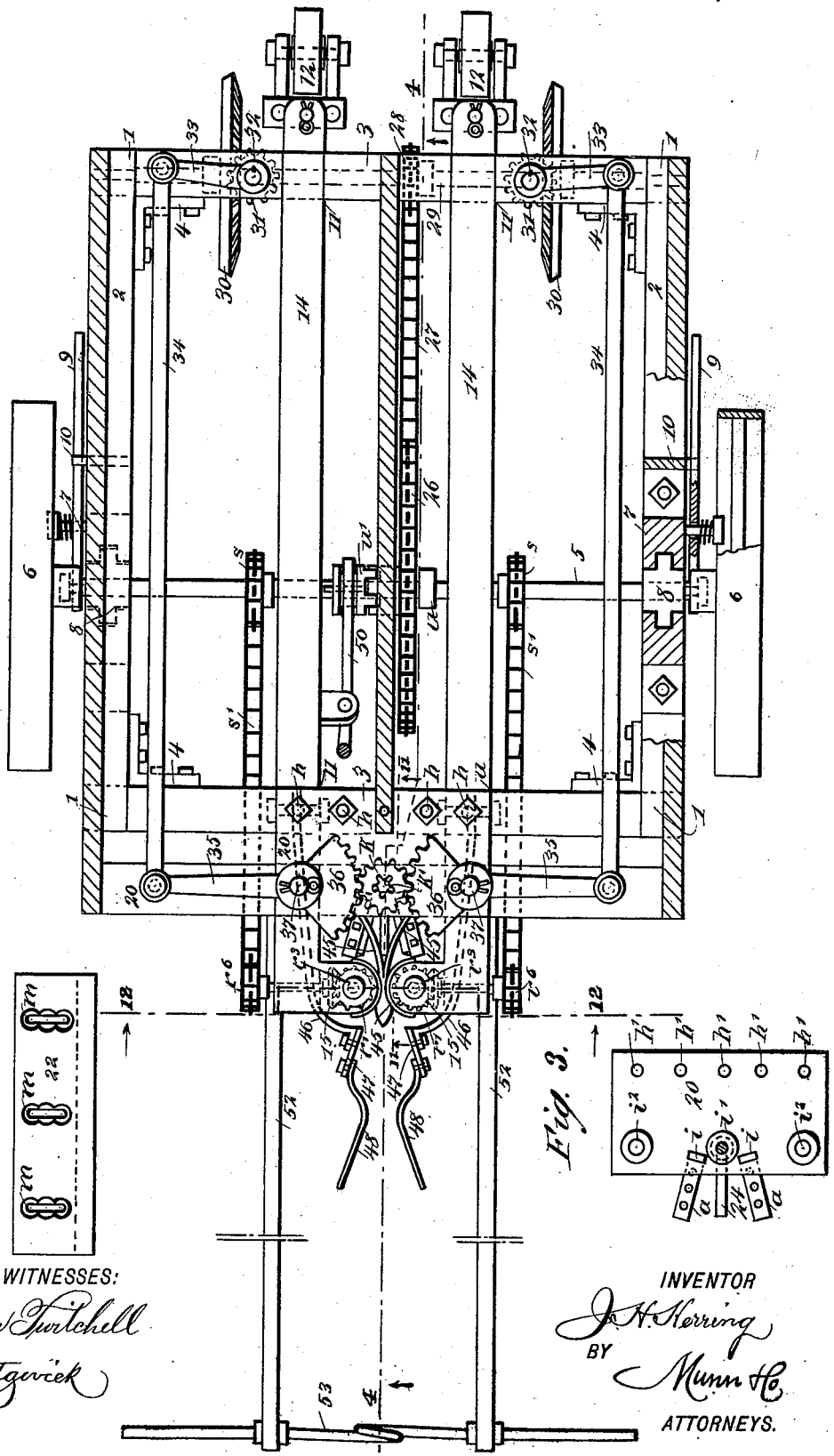

(No Model.) 3 Sheets—Sheet 3.
J. H. HERRING.
STALK CUTTER.
No. 510,789. Patented Dec. 12, 1893.
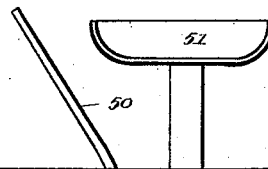
Fig. 12.
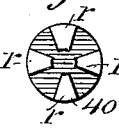
Fig. 12ᵇ.
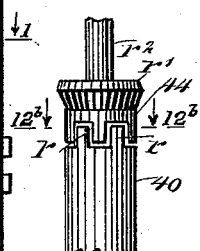
Fig. 12ᵃ.
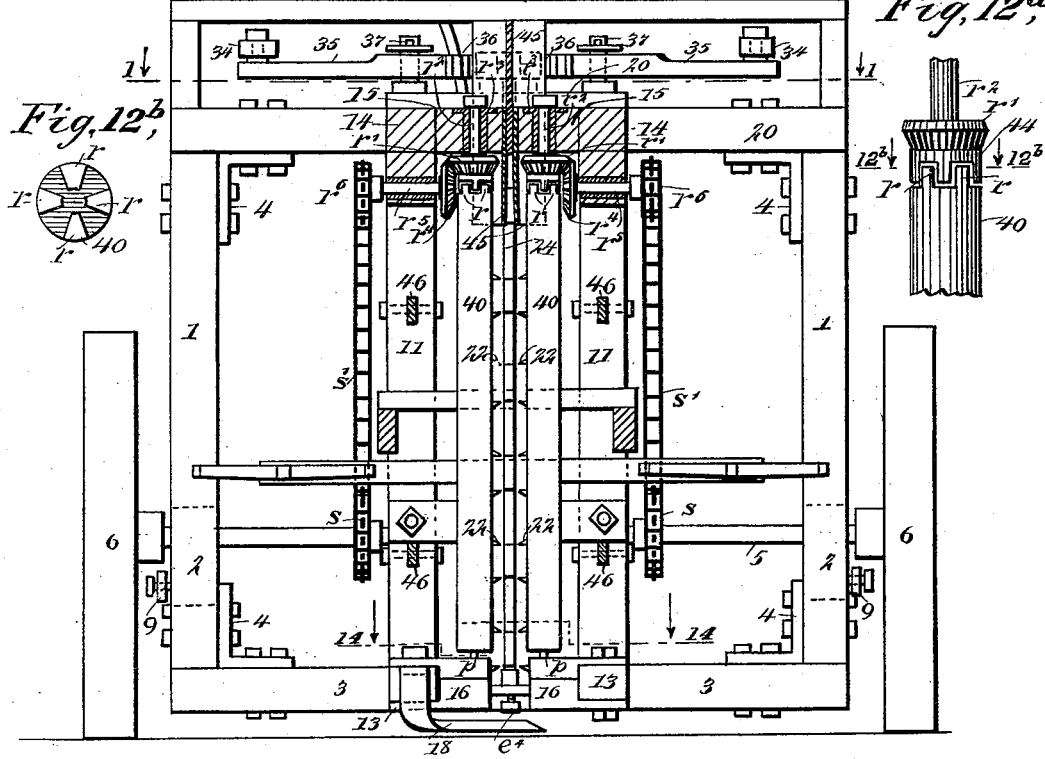
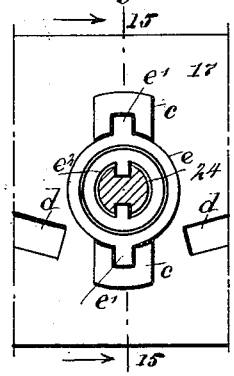
Fig. 13.
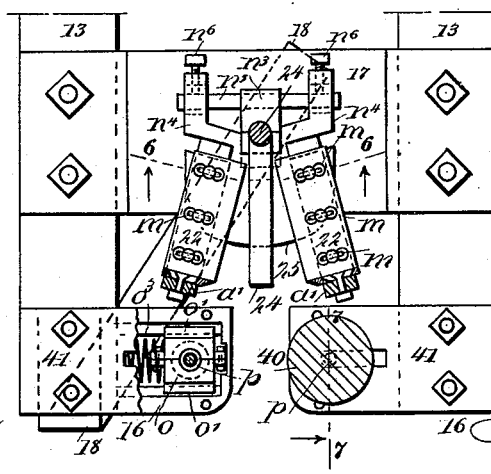
Fig. 14.          Fig. 15.
WITNESSES:
Donn Twitchell
Co. Sedgwick
INVENTOR
J. H. Herring
BY
Munn & Co.
ATTORNEYS.
THE NATIONAL LITHOGRAPHING COMPANY,
WASHINGTON, D. C.

UNITED STATES PATENT OFFICE.

JAMES H. HERRING, OF MURPHY, TEXAS.

STALK-CUTTER.

SPECIFICATION forming part of Letters Patent No. 510,789, dated December 12, 1893.

Application filed January 28, 1893. Serial No. 460,139. (No model.)

*To all whom it may concern:*

Be it known that I, JAMES H. HERRING, of Murphy, in the county of Collin and State of Texas, have invented a new and useful Improvement in Stalk-Cutters, of which the following is a full, clear, and exact description.

My invention relates to improvements in machines for cutting corn stalks or cotton stalks, while standing in the field, and has for its objects to provide a novel, practical device of the character indicated, which will cut off the stalks at their roots while the machine is drawn along a row of the standing stalks, and simultaneously reduce the latter to small pieces which can be plowed under the soil and serve as a fertilizer, the complete reduction of the stalks to fine fragments adapting them for quick decomposition and preventing them from becoming an obstruction to a plow or harrow used to till the soil.

To these ends my invention consists in the construction and combination of parts, as are hereinafter described and claimed.

Reference is to be had to the accompanying drawings forming a part of this specification, in which similar figures and letters of reference indicate corresponding parts in all the views.

Figure 1 is a plan view of the device, partly in section on the line 1—1 in Fig. 12, showing parts that are removed in said figure. Fig. 2 is a top view, enlarged, of one of a number of stalk cutting knives used on the machine. Fig. 3 is a top view of a supporting plate that is a detail of construction of the machine, its location being indicated by the arrow 3 in Fig. 4. Fig. 4 is a side view of the device, partly in section on the line 4—4 in Fig. 1. Fig. 5 is an enlarged sectional side view in part of an important detail of construction, its location being indicated by the arrow 5 in Fig. 4. Fig. 6 is a transverse sectional view on the line 6—6 in Fig. 14. Fig. 7 is a longitudinal sectional view, on the line 7—7 in Fig. 14. Fig. 8 is an enlarged detached top view of one of a series of clamping blocks that are a part of the novel machine. Fig. 9 is a side or edge view of the part shown in Fig. 8. Fig. 10 is a detached perspective view in part of one of a pair of cutter frames, which are novel features of the machine, and knives thereon. Fig. 11 is a sectional side view of a portion of the cutting mechanism of the machine at its upper end, taken on the line 11—11 in Fig. 1. Fig. $11^a$ is a side view, partly in section, of the lower parts of the cutting device with portions removed, said parts being located on the machine opposite the arrow 11 in Fig. 4. Fig. 12 is a transverse sectional view on the line 12—12, in Fig. 1. Fig. $12^a$ is a side view of the upper portion of a cylindrical roller and a connected gear wheel, which are parts of the improvement. Fig. $12^b$ is a top end view of the roller shown in Fig. $12^a$, on the line $12^b$ in said figure. Fig. 13 is an enlarged plan view of parts detached, taken on the line 13—13, in Fig. 15. Fig. 14 is an enlarged plan view, partly in section on the line 14—14 in Fig. 12; and Fig. 15 is a vertical sectional view of parts enlarged and detached, taken on the line 15—15 in Fig. 13.

The stalk cutter briefly considered, consists of a frame of proper height and width, adapted to be drawn along a row of standing stalks, which stalks are cut off and then are automatically gripped by parts of the machine, and from these gripping devices thrust within the embrace of two sets of adjustable knives that are vertically arranged in spaced order; another vibratable part of the device co-acting with the fixed knives so as to subdivide the upright stalks into fine fragments, that fall to the ground as the machine is progressively moved, the working parts of the device being actuated by the draft force applied to propel the entire apparatus.

The main frame of the stalk cutter comprises a rectangular structure having four vertical corner posts 1 that are joined by the side beams 2, which are affixed to the posts in parallel planes near the upper and lower ends of the latter on each side, the frame being completed by the transverse beams 3, that are also firmly secured to the posts adjacent to the side beams.

The main frame is reinforced at all the joints where its members are connected, by metal angle plates such as 4, in Figs. 1, 4 and 12 of the drawings, which plates are firmly bolted to the beams 1, 2, 3, that may be constructed of wood or metal.

The width of the main frame should be sufficient to permit it to travel between two adjacent rows of corn stalks or cotton stalks, that should be engaged near the transverse center of the machine, the height of the frame being sufficient to receive tall corn stalks, as will be further explained.

On the lower side beams 2, which are the sills of the frame, a transverse axle 5 is located, its position being near the front side of the machine to adapt it to properly support the excess of weight that is disposed forwardly on the frame by the necessary placing there of heavy working parts, as will hereinafter appear. The axle 5 is furnished at each end with the similar traction wheels 6, that are of considerable diameter and breadth of rim, to adapt them to traverse the soft ground of a field without sinking therein too deeply. Two pedestal frames 7 are provided to afford guides and supports for the boxes 8 that loosely engage journals on the axle 5 near the wheels 6, said frames being seated oppositely on the sills 2 and thereto secured by bolts, as shown in Fig. 4. The boxes 8 are vertically adjustable in the pedestal frames 7, and are retained at any point of desired elevation therein by a lever 9 provided for each box, which levers are pivoted on the sides of the pedestals and loosely engage one end with the adjacent box; and the longer portions of the levers extending rearward from the pedestal frames detachably engage with vertical racks 10 that project from the sills 2 and serve to retain the interlocked levers at any point of depression for their long members, which will retain their other ends elevated and correspondingly elevate the boxes 8.

At a proper and equal distance from the median line of the frame, two parallel vertical stanchions 11 are erected at the front and also at the rear of said frame, extending vertically between the cross-sills 2 and top cross-pieces 3. On the lower ends of the rear stanchions, two similar heavy caster wheels 12 are secured by a bolted attachment of their swiveling bracket frames thereto, as shown in Fig. 4, which wheels, co-acting with the traction wheels 6, afford a rotatable support for the main frame of the machine and adapt it for an easy progressive, or a quick turning movement, as occasion may require. In the same plane with the stanchions 11, two pairs of spaced and parallel beams or stringers 13 and 14 are introduced, which are affixed to the rear and front cross beams, their front terminals being secured to the horizontal top and bottom cross braces 15, 16, which project toward each other in pairs and afford a support for other mechanism of the machine.

At a suitable distance in front of the cross beams 3, 3, a transverse base plate 17 is bolted upon the projecting portions of the lower intermediate longitudinal and parallel beams 13, and above on the longitudinal intermediate beams 14, another plate 20 is secured by its ends. The intermediate timbers or beams 13, 14, are sufficiently spaced apart in pairs to admit the introduction and proper operation of the stalk reducing device which will presently be described, this consisting of parts vertically sustained between the base plate 17 and the cap-plate 20, and engaging therewith, as will be explained.

The vertical cutting mechanism mentioned, comprises two upright stationary knife frames that are divergent toward the front side of the machine, and having cutting knives arranged in parallel planes and also at a right angle to each pair of parallel knives, a zig-zag or undulating beater frame being vertically sustained and adapted to vibrate between the fixed knife frames, so as to force the stalks against the knives on the latter and sever them into numerous short pieces. The fixed knife frames are each composed of a bar that is rectangular in cross section, having a sufficient length to permit the formation therefrom of a zig-zag or return bent frame shown in Figs. 4 and 10, there being a proper number of the square cornered loops $a$ formed in the bar and joined together by the upright spacing bars $b$, so as to produce an integral frame having a series of flat horizontal knife-holding bars that in pairs form the top and lower side of each loop $a$, the upright members $a'$ of said loops being also designed to each receive and retain thereon a cutting knife.

Such a proportionate length is given to each of the knife frames, as will adapt this pair of frames to engage their vertical end portions with angularly slotted holes in the cap-plate 20 and like orifices in the base plate 17, as represented respectively in Figs. 11 and 11$^a$ of the drawings. Such a degree of equal lateral divergence from the median line of the main frame is given to the similar upright knife frames at their front edges, as will be best adapted to present a shear cutting edge for the knife blades 22 that are bolted upon the horizontal members $a$ of the knife frames on the inner surface of said parts, as shown in Figs. 4 and 10, so that their beveled cutting edges will all overhang the same side edges of the knife frame they are located upon, and each set of knives has its cutting edges projected toward each other or upon the inner sides of the knife frames, as indicated in Fig. 6.

On each vertical spacing bar $a'$, a cutting blade 23 is removably secured by bolts, and these blades which are flat plates beveled on one edge in like manner to the blades 22, have their beveled cutting edges projected in the same direction as are like edges of the blades 22.

Between the forwardly divergent knife-supporting frames a reel or beater frame 24 is vibratably supported, its journal ends being loosely engaged with the cap-plate 20 and base plate 17. The beater frame 24 is of substantially the same form as that of the pair of knife frames, and its laterally return bent members that are of an equal projection from the shaft they are portions of, have such a relative length or lateral projection therefrom and space between members, as will permit these parts to vibrate between the knives on the stationary knife frames, and nearly touch the sharp edges of the horizontal and vertical knives of each frame. As before mentioned, the beater frame 24, is supported in a vertical position by its imposition upon the base plate 17, the preferred means for effecting its vibratable support comprising several parts which will presently be described.

The base plate 17, clearly represented in Figs. 13, 14 and 15, consists of an oblong plate of a length that will permit its flanged end portions to rest upon the intermediate stringers or beams 13 and be thereto bolted, a suitable depression being produced between these end flanges, to afford room for the step or composite box which receives the lower end of the upright shaft that is a part of the beater frame 24. On a transversely central line, two similar upright blocks $c$ are erected upon the upper side of the base plate 17, equally removed from the longitudinal center of said plate, and properly separated to permit other parts to be introduced between them. See Figs. 13 and 15. The relative position of the blocks $c$ is such with regard to the step holes $d$, formed in the plate 17, for the reception of the lower ends of the knife frames, that the box which engages said blocks and serves to rotatably support the lower end of the beater frame 24, will be properly located so as to maintain the beater frame at a correct distance from each knife frame.

The preferred device for sustaining the foot of the beater frame 24, consists of a cylindrical cup $e$ that is provided with two diametrically opposite ribs $e'$, which are fitted to slide vertically within opposite grooves formed on the adjacent faces of the upright blocks $c$, so as to lock the cup removably upon the base plate 17, and permit it to be vertically adjusted. The cup $e$ is finished within to render its bottom level and its side wall truly cylindrical, internally considered, said cup being produced from any suitable material that is capable, in a large degree, of resisting the abrasive action to which this part is subjected in service.

To adapt the lower end or foot of the shaft of the beater frame 24 to have its wearing surface renewed conveniently, and thereby conduce to the effective action of said part for a considerable length of time, there is a cylindrical cup-shaped shoe $e^2$, fitted upon the lower end of the beater shaft, and thereto removably secured, preferably by a tongue and groove connection, as shown in Figs. 13 and 15, the shoe being formed of material that is capable of withstanding friction when lubricated, and is fitted to loosely engage the inner side and bottom surface of the cup-like step $e$.

The cap-plate 20 that is secured directly above the base plate 17 on the forward extensions of the intermediate beams 14, as before mentioned, is mainly held in place by spaced bolts $h$, that pass through the front upper transverse beam 3, and also through aligning holes in the cap-plate, formed parallel with and near to its rear edge as at $h'$ in Fig. 3, said bolts being furnished with clamping nuts that forcibly clamp the plate in place, as indicated in Figs. 1 and 4.

The upper ends of the knife frames enter diagonal slots $i$ in the cap-plate 20, as indicated in Fig. 3, and as shown in said figure and also in Fig. 4, the upper journaled end of the beater frame shaft, engages a removable box $i'$, that is inserted through a suitably shaped aperture formed at a proper point in the cap-plate. Said box has a radial flange at its upper end which prevents it from sliding downwardly out of the plate 20, whereon said flange is seated, and in turn affords a support for the pinion $k$ that is removably secured to the upper end of the beater shaft, which is furnished with radial key wings that enter proper grooves in the center bore of the pinion and thus interlock the pinion with the beater shaft, as shown at $k'$ in Figs. 1 and 4.

As represented in Fig. 2, three or more transverse spaced slots $m$ are formed in each cutting blade 22 and 23, and countersunk depressions are produced in series in each slot at proper degrees of separation, so as to permit the single bolt $m'$, which engages each slot in a blade, to seat its head in the countersink, and thus lie flush with the surface.

The provision of the series of countersunk depressions in each cutting blade 22, 23, allows said blades to be set with their cutting edges properly advanced toward each other in pairs, and compensate for wear sustained by the blades when ground to sharpen them, the engagement of the bolt heads $m'$ with the countersinks preventing the blades from being crowded back on the frame bars to which they are secured.

In order to afford support to the knife frames and the vibratable beater frame 24, intermediate of their ends, a series of similar spacing and clamping blocks 25 are provided, which blocks are adapted for a secured engagement with said frames at spaced intervals throughout their length. As represented in Figs. 5, 6, 8, 9 and 14, where the blocks 25 are presented in enlarged proportions, said pieces each consist of a thick flat slab of metal, preferably rounded transversely on the edge at its front end and oppositely slotted from each side edge toward a longitudinal center line, as at $n$, $n'$ in Fig. 8, any suitable number of such slots being produced along each side.

The opposite end of each spacing block 25 is centrally notched as at $n^2$ in Fig. 8, to receive a laterally divided box $n^3$, shown in Figs. 5 and 14, and which has a tongue on one half of the same that enters a recess in the back wall of the notch $n^2$, so as to interlock this portion of the box with the spacing block upon which it is slid. On each side of the box $n^3$ a limb $n^4$ is projected from the sides of the block 25, in parallel planes, and these limbs are laterally and oppositely apertured on each block 25 for the reception of a clamping bar $n^5$, as shown in Fig. 14. Said bar which loosely engages the perforated limbs with its ends, is adapted to enter a transverse groove in the rearwardly projecting half of the box $n^3$, so as to support this portion of the box, a set screw bolt $n^6$ that is provided for each limb $n^4$ and engages a tapped hole in its rear end, having a bearing on the end of the bar, so that a proper adjustment of both set screws in each block will cause the halves of the boxes $n^3$ to be clamped together and retained in place upon the blocks 25.

Each of the spacing blocks 25 is introduced between the knife supporting horizontal bars $a$ of the knife frames and receives the opposite vertical spacing bars $b$ of said frames in the pair of notches $n'$, that are pitched rearwardly at their outer ends a proper degree to receive said members of the forwardly divergent frames, the other notches or slots $n$ in the blocks 25 being adapted to receive nuts of the bolts that clamp the cutting knives 22 in place on the frame members, as indicated in Fig. 6, said slots permitting a rotatable adjustment of the nuts $m^2$ on the bolts $m'$ to be effected when this is necessary, the nuts when in place serving to retain the blocks 25 from displacement.

When the several blocks 25 are introduced as shown in Figs. 4 and 6, the upright journaled portions of the beater frame shaft will lie opposite said blocks, and be adapted for the loose clamping engagement therewith of the divided boxes $n^3$, which, when placed in position so as to embrace all the journal portions, may be adjusted to have a proper contact therewith by setting the screw bolts $n^6$, as before explained.

Referring again to the stepped lower end of the vibratable beater frame 24, it should be mentioned that there is an adjusting screw bolt $e^4$ inserted through a threaded hole in the base plate 17 at the axial center of the beater shaft, which screw bolt, by its engagement with the bottom of the cup $e$, serves to adjust the beater frame accurately for height, and thus affords means to set the lateral members of said frame at proper points with regard to the cutting edges of the blades 22, so that an efficient action may be secured for all the knives, and frictional contact of the beater frame therewith be avoided.

The preferred means for communicating a vibratory motion from the axle 5 to the beater frame 24, consists essentially of a sprocket wheel 26, having a considerable diameter, loosely secured upon the axle near its longitudinal center, as shown in Fig. 1, and adapted for an arrest of rotary motion by a clutch, which will be further mentioned, which wheel is connected by a sprocket chain 27, with a smaller sprocket wheel 28, affixed upon a transverse shaft 29, journaled on the rear posts 11 of the main frame at a proper height. At suitable points on the shaft 29, two similar bevel gear wheels 30 are mounted and affixed, said gear wheels being meshed with pinions 31, secured on the lower ends of two similar vertical shafts 32, which are rotatably sustained by any proper means on the rear of the main frame so as to permit the geared connection of the wheels and pinions as stated. Upon each of the upper ends of the shafts 32, a crank arm 33 is secured, and the arms project oppositely, or toward the sides of the main frame, and are pivotally connected at their outer ends with the rear ends of two parallel rods 34, that are pivoted by their forward ends to the outer ends of arms 35, which are projections from two similar toothed sectors 36, the rods 34 being extended along each side of the main frame on top, as shown in Figs. 1, 4 and 12.

The sector plates 36 are perforated at their radial centers, and are loosely mounted upon similar stud bolts 37, which have a secured engagement of their lower ends with the perforations $i^3$ in the cap-plate 20, shown in Fig. 3, the plates 36 being retained in place by washers and split keys, or other equivalent means.

The length of the crank arms 33 is so proportioned to the length of the sector arms, and also of the sectors 36 from the centers of their pivot supports 37, that a revolution of the crank arms will communicate a proper vibratory motion to the toothed edge of each sector in opposite directions, which will adapt the sectors to partly rotate the pinion $k$, that is slidably held on the upper end of the beater shaft, as before mentioned. The degree of vibration thus transmitted to the beater frame 24, is so gaged that it will cause the latter to pass through each knife frame and force the stalks that may be introduced between the latter, to be cleanly severed by each knife blade 22; the construction and relative arrangement of parts adapting the beater frame horizontal bars and the adjacent knife blades named, to co-act as members of shears, and so cut with much less resistance than would be presented if the entire edge surface of the blades 22 were engaged by the material at the same time by a parallel pressure of the stalks against the blade edges.

Forwardly on the main frame and between lateral projections of the front ends of the intermediate horizontal frame timbers 13, 14, two similar cylindrical feed rollers 40 are loosely supported, so as to be properly separated and held normally in vertical planes, but adapted to yield and spread apart at their lower ends a limited degree for effective service.

The preferred means for supporting the lower ends of the rollers 40, consists of similar slide boxes $o$, each formed of half sections that are spherically cupped where their edges join on a line transversely of the main frame timbers whereon these boxes are supported, and these boxes have a sliding engagement with elongated rectangular apertures in the cap-plates 41, which plates are bolted upon the transverse foot blocks 16, that project toward each other in the same plane from the front ends of the intermediate beams 13.

The foot blocks 16 are made of wood or metal and are channeled longitudinally for a portion of their length near their inner or adjacent ends, to afford a guide way for the boxes $o$, which have opposite wings $o'$ formed on them to adapt them for a proper movement in the guideway mentioned; the parts being described are most clearly shown in Figs. 7 and 14.

The slide boxes $o$ are perforated centrally of their cupped cavities on their upper sides, so that the spindle $p$ that is projected downwardly and axially from each roller 40 at its lower end, may penetrate one of the slide boxes and rest upon a round ball $o^2$ that is introduced within each box before its half sections are united by bolts, which latter engage perforated flanges on the ends of the box sections, as represented in Fig. 14 at the left side of the view.

Each slide box $o$ is pressed by a spring $o^3$ toward the median line of the main frame of the machine when the parts are assembled, and the cap-plates 41 are bolted upon the foot blocks 16. The plates 41 are longitudinally slotted of a proper length at their transverse centers to admit the spindles $p$, and allow the slide boxes $o$, engaged by said spindles, to traverse the guide-ways provided for them, which guide-ways are partly formed in said cap-plates 41, as indicated in Fig. 7.

At the upper ends of the feed rollers 40, a clutch formation is produced on each of said parts, having the shape shown in Figs. 12, $12^a$, $12^b$, and consisting of four lugs $r$ that are formed on the upper terminals of the cylindrical rollers oppositely in pairs, which lugs are so proportioned in dimensions, as to allow four slightly wider spaces to intervene between each adjacent pair of lugs. A clutch head 44 having an integral bevel gear pinion $r'$, is furnished for each roller 40, and on its lower surface lugs are formed that will loosely interlock with the lugs $r$ of the roller, the depending lugs entering the spaces between the upwardly projecting lugs, as shown in Figs. 12 and $12^a$. From the upper side of each clutch head 44, a short journal shaft $r^2$ projects axially and vertically, these journal pieces having a rotatable engagement with boxes $r^3$ of proper size that are secured in lateral projections from the intermediate beams 14, as shown in Fig. 12. The bevel pinions $r'$ are in geared connection with similar pinions $r^4$ secured on the inner ends of short horizontal shafts $r^5$, loosely engaging boxes located in depending portions of the main frame of the machine, the outer ends of these shafts each having a sprocket wheel $r^6$ affixed upon them.

On the axle 5, a pair of sprocket wheels $s$ is secured, these wheels being respectively aligned with the sprocket wheels $r^6$, so as to permit their connection therewith by the sprocket chains $s'$, whereby rotary motion is transmitted from the axle to the rollers 40, in a direction toward each other, at a proper speed for efficient service.

There is a guard-plate 45 of sheet metal oppositely bent to partly encircle the upper ends of the feed rollers 40 on their surfaces that are nearest to each other, as shown in Fig. 1, these guard pieces being of sufficient dimensions to protect the clutch connections and gearing on the upper portions of the rollers from impediment to free action, which might be produced if stalks were permitted to pass into these parts of the mechanism, a suitable form being given to the guard plates to adapt them to guide all material that crowds between the upper ends of the rollers through the space between said parts and drop the material between the knife frames for comminution by the cutting devices before explained.

From the forward vertical stanchions 11 of the main frame of the machine which are between the corner posts 1, a set of brace bars 46, is secured to each stanchion, each set comprising a proper number of similar curved and suitably spaced bars that project partly around the rollers 40, in front of the same, and are secured to a vertical guide plate 47, so as to maintain the guard-plates at a proper degree of separation, and forwardly divergent to adapt them to guide stalks rearwardly and between the rollers 40, when the machine is in use.

On the forward extension of one of the intermediate horizontal timbers 13, a cutter knife 18 is affixed by one end, said knife being bent downwardly and then rearwardly, so as to cross the path of the knife frames 21 and beater frame 24 below their bottom supports, as indicated in Figs. 4 and 14, said knife being of strong construction and sharpened on the edge that is nearest to the center of the main frame of the machine, which edge lies close to the ground traversed by the latter, and is adapted to sever stalks that are encountered by it when the apparatus is forwardly moved abreast of a row of corn or cotton stalks that are standing in a field, the point of excision being near the roots of the plants, so that no part of the stalks will be left standing after the machine has traversed a row.

On each of the guide plates 47, a lifter arm 48 is secured, which arms are of a like form and are bent so as to project forwardly and downwardly toward the ground, and from their position be enabled to raise fallen stalks of corn or cotton and direct them between the rollers 40, and permit the knife 18 to sever them from their roots and insure the passage of the fallen stalks between the knife frames and beater frame 24, the upright knives 23 on the knife frames serving to cut all parts of the stalks that are not engaged by the blades 22.

The sprocket wheel 26 is loose on the axle 5, and has on one side rotatable contact with a fixed collar $u$, said wheel having clutch jaws on its other side that may be engaged by a sliding clutch head $u'$, see Fig. 1, when said head is slid toward the wheel by a lever 50, which loosely engages said head and projects upwardly and forwardly of a sufficient length to be easily reached by the driver of the team that draws the machine, and who occupies the seat 51. Shown in Figs. 4 and 12.

From the front stanchions of the main frame, two parallel draft-poles 52, are forwardly projected of a sufficient length for the harnessed connection therewith of a pair of draft animals (not shown), these being attached to the double tree and single trees represented in Fig. 12. At the front ends of the poles 52, an upright arched yoke 53 is attached, which yoke affords means to secure the horses to the machine and keep the poles spread sufficiently for the free passage between them of the row of corn stalks or cotton plants, which are to be cut and fragmented by the machine.

In service, the stalk cutter is drawn abreast of each row of corn or cotton stalks and, as before stated, the standing or prostrate stalks will be drawn between the feed rollers 40, which from their manner of support, will yield a limited degree, so as to admit one or more stalks between them at one time, and thus insure the proper delivery of the stalks to the cutter blades 22, 23, as before mentioned.

When the knives on the stationary knife frames are to be thrown out of service and the beater frame 24 arrested in movement, the lever 50 is vibrated to effect this, a resumption of cutting action being attainable by a proper movement of said lever at any time this is desired.

It will be seen that by the use of this improvement the stalks of corn from which the ears have been gathered, or cotton stalks that have been denuded, may be cleanly removed from the field where they were grown, and at the same time reduced to small fragments that a subsequent plowing of the soil will embed and mix therewith, these small fragments of vegetable fiber being in condition for quick decomposition and assimilation with the soil, to enrich it.

Having thus described my invention, what I claim as new, and desire to secure by Letters Patent, is—

1. In a stalk cutter, the combination with a movable main frame, of an upright stalk-fragmenting device on said frame, having stationary cutter blades, and a vibratory stalk beater between and a stalk cutting knife below said fragmenting device, substantially as described.

2. In a stalk cutter, a progressively movable main frame, a stalk-fragmenting device vertically sustained on said frame, comprising a series of stationary cutter blades and an intervening beater frame and a horizontal stalk-cutting knife below the fragmenting device, substantially as described.

3. In a stalk cutter, the combination with a main frame, a transverse axle, traction wheels thereon, and caster wheels at the rear of the main frame, of a forwardly-receiving upright stalk-fragmenting device on said frame, having spaced stationary cutter blades, and an intervening vibratile beater frame adapted for actuation from the axle, and a stalk cutting knife below the fragmenting device, substantially as described.

4. In a stalk cutter, the combination with a movable main frame of upright divergent knife-holding frames at the front of the frame, an intervening vibratory beater frame, means to vibrate the beater frame, and a stalk cutter knife below the knife frames and beater frame, substantially as described.

5. In a stalk cutter, the combination with a movable main frame, of forwardly divergent knife frames on said main frame, adjustable cutter blades thereon, an intervening vibratory beater frame, means to vibrate the beater frame, and a diagonally projected horizontal knife below the knife frames and beater frame, substantially as described.

6. In a stalk cutter, the combination with the main frame and the two zig-zag upright and forwardly divergent knife holding frames on the front of the main frame, and sets of knives thereon, of an intervening zig-zag upright and vibratable beater frame, and means to vibrate said beater frame, substantially as described.

7. In a stalk cutter, the combination with a rectangular main frame, a transverse axle, traction wheels thereon, boxes therefor, an adjusting device for each box, adapted to regulate the height of the axle on the frame, and a pair of caster wheels on the main frame at its rear lower edge, of a horizontal cutting knife forwardly and beneath the main frame, an upright stalk fragmenting device above said knife, and mechanism adapted to actuate the fragmenting device from the rotating axle, substantially as described.

8. In a stalk cutter, the combination with a rectangular main frame adapted for movement on wheels, of a cutting knife beneath said frame, horizontally held and diagonally projected across the median line thereof, a stalk-fragmenting device upright and above said knife, two vertical rollers forward of the fragmenting device, and adapted to feed stalks between them to said device, and mechanism for actuating the fragmenting device simultaneously with the progressive movement of the main frame, substantially as described.

9. In a stalk cutter, the combination with a traveling main frame, of two upright forwardly divergent stationary knife frames, cutter blades adjustable thereon, an intermediate upright beater frame which is vibratable and that may be vertically adjusted, and a device to vertically adjust said beater frame, substantially as described.

10. In a stalk cutter, the combination with a traveling main frame, of two upright stationary and forwardly divergent knife frames, cutting blades adjustable thereon, a vibratable upright beater frame intermediate of the knife frames and adapted to pass the knives thereon to produce a shear cut, a device engaging the foot of the beater frame shaft and adapted to vertically adjust said frame, and means to vibrate the beater frame when the main frame is progressively moved, substantially as described.

11. In a stalk cutter, the combination with a traveling main frame, two upright stationary and forwardly divergent knife frames thereon, an upright intermediate vibratable beater frame, and a device for vertically adjusting the beater frame, of two upright cylindrical feed rollers in advance of the beater frame and adapted for a limited lateral yielding movement on the main frame, a device to vibrate the beater frame, and means to rotate the feed rollers toward each other, substantially as described.

12. In a stalk cutter, the combination with a main frame, rolling supports therefor, and means to vertically adjust said supports, of an upright stalk-fragmenting device forwardly on said frame, a cutting blade horizontally held and diagonally projected across and below the fragmenting device, two upright cylindrical rollers adapted for a limited yielding movement and spring-pressed toward each other, and two upright forwardly flared guide plates or wings held from the main frame in front of the feed rollers, substantially as described.

13. In a stalk cutter, the combination with a traveling main frame, of an upright stalk-fragmenting device forwardly divergent at the front of the main frame, mechanism adapted to transmit motion from an axle and traction wheels on the main frame to actuate the fragmenting device, two upright similar feed rollers on the main frame forward of the stalk-fragmenting device, gearing above on the frame connected to the rollers and adapted to revolve them toward each other, and supports below for the rollers, that spring-press them toward each other and permit their limited lateral divergence, substantially as described.

14. In a stalk cutter, the combination with a main frame, a transverse axle, two traction wheels thereon, supporting boxes on the axle, a device for each box that adapts them for a vertical adjustment, and two caster wheels rearwardly on the main frame, of a stalk-fragmenting device upright and forwardly on the main frame, mechanism moved from the axle and actuating the stalk fragmenting device, and a clutch coupling device that by manipulation controls the actuating mechanism for the stalk-fragmenting device, substantially as described.

15. In a stalk cutter, the combination with a rolling main frame vertically adjustable forwardly, and an upright stalk-fragmenting device thereon near the front, of two cylindrical feed rollers in advance of the fragmenting device, each supported to yield laterally and below by a guideway on the main frame, a hollow foot block, a ball rotatable in said foot block, a depending spindle on the roller penetrating a slotted cap plate of the foot block and resting on the ball, and a spring for each roller, adapted to press their spindle supports toward each other, substantially as described.

JAMES H. HERRING.

Witnesses:
ELY WRIGHT,
THOMAS MANGAN.